Figures 1, 2, 3:
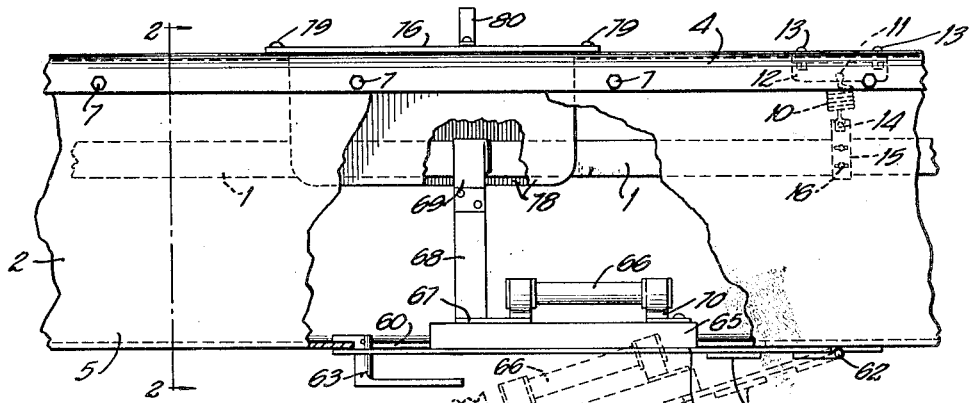

March 21, 1939.  M. J. DE MASK  2,150,963

BARRIER FOR BUS DUCTS

Original Filed July 12, 1935

INVENTOR
Martin J. De Mask

Patented Mar. 21, 1939

2,150,963

UNITED STATES PATENT OFFICE 2,150,963

BARRIER FOR BUS DUCTS

Martin J. De Mask, Pittsfield, Mass.

Original application July 12, 1935, Serial No. 30,956. Divided and this application November 10, 1937, Serial No. 173,744

3 Claims. (Cl. 175—307)

My invention more particularly relates to barriers for bus-ducts of the character shown and described in my prior application, Serial No. 30,956, filed July 12, 1935, of which the present application is a division.

One of the objects of my present invention is the provision of barrier members disposed at intervals within a bus-duct, and positioned between the bus bars so that arcing will be prevented between the bus bars within the duct when the contact blades of switches, or plugs, are disconnected from the bars. Another object of my present invention is to provide a barrier member which may readily be inserted into a duct at points where contact is made or broken with the bus bars by the contact blades of switches or plugs. Other objects of my invention will be apparent to those skilled in the art upon reference to the appended drawing, in which Fig. 1 is a side elevational view of a portion of a bus-duct showing a barrier member in operative position therein, the wall of the duct being broken away for clearness of disclosure;

Fig. 2 is a sectional view substantially on line 2—2, of Fig. 1, and showing certain parts in elevation; and Fig. 3 is a fragmentary sectional view illustrating a barrier in elevation.

Referring to the drawing, substantially rigid bus bars 1 extend longitudinally of a duct 2. In the drawing the bus bars are shown as three in number but it will be understood that the number thereof may be varied as required.

The duct is usually made up of lengths or sections, joined end to end by being overlapped and bolted, each length comprising a shallow channel member 4 from which the bus bars are supported and a mating channel member 5 of greater depth than member 4. The channel member 5 extends completely around three sides of the bus bars and is joined to member 4 in a plane in the space between the bus bars and the back wall of member 4. The edges of member 5 are bent inwardly as at 6 for insertion into underlapping relation with the edges of member 4 and the parts are held together at suitable intervals by bolts 7 or other suitable means.

The bus bars are supported at suitable intervals from member 4 by means of spring hangers, shown as comprising a coiled spring 10 having one end secured, as indicated at 11, to an insulating base 12 which is secured to member 4 by bolts 13 or other suitable means. The opposite end of the spring 10 is flattened and riveted or otherwise secured as at 14 to flat metal strip 15 which is preferably attached to a bus bar by means of bolts provided with wing nuts 16.

It is often advantageous to connect power take-off leads to the bus bars by means of a switch device with which fuses or other circuit interrupting means may be associated. Referring to Figs. 1 and 2, an opening 60 is provided in that side of member 5 opposite member 4. A plate 61 is hinged to member 5 as at 62 to be swung into position to close opening 60, a latch 63 being provided to hold the plate in closed position. An insulating block 65 is preferably secured to the inner face of plate 61, though it may be formed integral therewith. Block 65 is shown as carrying circuit interrupting means such as fuses 66 only one of which is illustrated in Fig. 1 and each of which is connected by a conductor 67 to a rigid contact blade 68 secured to block 65 and provided at its free end with a contact clip 69 adapted to engage the bus bars when the plate 61 is in closed position. Power take-off leads (not shown) may be connected to terminals 70 of the fuses, through suitable openings 71 formed in plate 61. As will be evident the electrical connection of blade 68 with the bus bar is made and broken by the act of moving plate 61 to closed or open position. It will be understood that a contact blade and either a fuse or other automatic circuit interrupting means would normally be provided for each bus bar within the duct, but that the number and arrangement of the conductors and the mechanism carried by plate 61 will be varied to meet desired conditions. It will also be understood that plate 61 instead of being hinged, as illustrated, might be secured to duct member 5 by means of wing nuts as shown in my said prior application.

In some cases, particularly where voltages are relatively high, or where heavy currents are taken from the bus bars over contact blades such as blade 68, it is desirable to provide barriers of insulation between a given bus bar and an adjacently located conducting member of opposite polarity to said bus bar such as other bus bars or a side wall of the duct, at points where the contact blades make, and break, electrical contact with the bus bars. Such barriers have in the past been co-extensive with the bus duct and have been provided as permanent parts of the duct structure, an arrangement which has added to the expense of manufacture, increased greatly the weight of the duct, and prevented moving the barriers from one location to another along the duct.

To maintain the flexibility of use which is afforded by the duct electrical distributing structure above described, I provide barriers which may be placed in position at intervals at the switch positions as a unit without disturbing the duct, bus bar hangers, or the bus bars, and without interfering with the switch mechanism. Referring again to the drawing, I provide handholes 75 in duct member 4 at points overlying the portion of the bus bars with which the switch blades, or other contact means carried by plate 61, come in contact. Through opening 75 is inserted a block of insulating, or other suitable material 76 having flanges 77 which rest on the edge portions of the duct about opening 75, to support the block. The under side of the block is provided with a plurality of barriers 78 some of which extend downwardly between and past the bus bars 1 and others of which extend downwardly between the bus bars and the side walls of the duct, thus preventing arcing between adjacent bus bars, and between the bus bars and the sides of the bus duct when the contact blades are withdrawn from contact with the bus bars.

The barrier block 76 is held in position over opening 75 by means of screws 79 which engage member 4 of the duct. A handle 80 may, if desired, be secured to the barrier block 76 by means of which the block may be more readily inserted or withdrawn from the duct.

Referring to Fig. 3, it will be seen that barrier block 76 may be secured to the inside of duct member 4 at desired intervals overlying the bus bars at points where the contact members of switches or plugs make, or break, contact with the bus bars. When the barrier block is secured to the inside of duct member 4 the flanges 77 and the handle 80 are omitted, as is also the opening 75 in duct member 4, the barrier block being secured to the inside of member 4 by nuts 81 before duct member 5 is placed in position. It will be understood that the barrier block shown in Figs. 1 and 2 might be secured to the inside of a conventional metal cover plate, and it will also be understood that opening 75 might be closed by a conventional metal cover when barriers are not needed.

Now having described novel details and arrangements of the barrier members shown in this application reference will be had to the following claims which determines the scope of the invention of this application.

What I claim is:

1. In an electrical distribution system, a duct run containing at least two spaced bus runs, an insulating base disposed to one side of said bus runs and having contact blades adapted for electrical engagement with, and disengagement from, said bus runs, said duct run being provided with an opening in a side remote from said insulating base and adjacent the opposite side of said bus runs, and a barrier member insertable into said duct run through said opening and into operative position between said bus runs and between the points where said contact blades are electrically disengaged from said bus runs.

2. In an electrical distribution system, a duct run containing bus runs, an insulating body disposed to one side of said bus runs and having contact elements adapted for electrical engagement with, and disengagement from, said bus runs, said duct run being provided with an opening in a side remote from said insulating body and adjacent the opposite side of said bus runs, and a barrier member insertable into said duct run through said opening and into operative position between a side of said duct run other than the side provided with said opening and an adjacent bus run and between said second-mentioned side of said duct run and the point where one of said contact elements is electrically disengaged from said adjacent bus run.

3. In apparatus of the character described, a duct run containing at least two spaced bus runs, an insulating body disposed to one side of said bus runs and having contact blades adapted for electrical engagement with, and disengagement from, said bus runs, said duct run being provided with an aperture in a side remote from said insulating body and adjacent the opposite side of said bus runs, and a closure for said aperture having spaced barriers which are inserted through said aperture and into operative position within said duct run when said closure is placed over said aperture, at least one of said barriers extending between said bus runs and between the points where the said contact blades are electrically disengaged from the said bus runs and another of said barriers extending between one of said bus runs and an adjacent side of said duct run and between said adjacent side of said duct run and the point where one of said contact blades is electrically disengaged from said last mentioned bus run.

MARTIN J. DE MASK.